United States Patent
Lubin et al.

(10) Patent No.: US 11,256,971 B2
(45) Date of Patent: Feb. 22, 2022

(54) AUTHENTICATION TAG

(71) Applicant: Xerox Corporation, Norwalk, CT (US)

(72) Inventors: Dara Lubin, Pittsford, NY (US); Jason Slack, Rochester, NY (US); Ron Edward Dufort, Rochester, NY (US); Brian Kroetz, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 361 days.

(21) Appl. No.: 15/889,890

(22) Filed: Feb. 6, 2018

(65) Prior Publication Data

US 2019/0244067 A1 Aug. 8, 2019

(51) Int. Cl.
  *G06K 19/06* (2006.01)

(52) U.S. Cl.
  CPC .............................. *G06K 19/0614* (2013.01)

(58) Field of Classification Search
  CPC ............ G07D 7/003; G07D 7/12; G07D 7/06; G07D 7/207; G07D 7/01; G07D 7/1205; G07D 7/164; B42D 25/351; B42D 25/435; B42D 25/45; B42D 2033/22; B42D 2033/30; B42D 2033/32; B42D 2035/34; B42D 2035/36; B42D 25/00; B42D 25/21; B42D 25/30; B42D 25/305; B42D 25/324; B42D 25/342; B42D 25/346; B42D 25/355; B42D 25/41; B42D 25/43; B42D 25/47; A44C 5/0015; B41M 3/148; G01B 11/06; G05B 19/4099; G05B 2219/49023; G06K 19/06196; G06K 9/00046; G09F 3/005; Y10T 24/1498; Y10T 24/3916; Y10T 24/3944; Y10T 24/4016; Y10T 24/4023; Y10T 24/44026; Y10T 24/44769; Y10T 24/44889; Y10T 428/24802; Y10T 428/24868; Y10T 428/24942
  USPC ....................................................... 235/494
  See application file for complete search history.

(56) References Cited

U.S. PATENT DOCUMENTS

| | | | | |
|---|---|---|---|---|
| 2010/0037326 | A1* | 2/2010 | Batistatos | B42D 25/328 726/34 |
| 2010/0132237 | A1* | 6/2010 | McDermott | G09F 3/005 40/633 |
| 2012/0314207 | A1* | 12/2012 | Bain | G01B 11/06 356/73 |
| 2013/0300101 | A1* | 11/2013 | Wicker | G07D 7/06 283/67 |
| 2017/0046901 | A1* | 2/2017 | Chosson | G07D 7/06 |
| 2018/0304668 | A1* | 10/2018 | Dietemann | B42D 25/305 |
| 2018/0330214 | A1* | 11/2018 | Gao | B42D 25/324 |

* cited by examiner

*Primary Examiner* — Thien M Le
*Assistant Examiner* — Tae W Kim

(57) ABSTRACT

An authentication tag and a method for producing the same are disclosed. For example, the authentication tag includes a substrate, a correlation mark printed on a first part of the substrate, a key printed on the second part of the substrate, wherein a portion of the substrate is transparent, and at least one raised feature is printed on the substrate.

17 Claims, 4 Drawing Sheets

AUTHENTICATION TAG

The present disclosure relates generally to authentication tags and, more particularly, to authentication tags that include correlation marks with a key and/or raised features.

BACKGROUND

Labels for medications and other products are counterfeited. Counterfeiting can cost different industries, such as the pharmaceutical industry, sports merchandise marketers, or the cosmetics industry loss of revenue. In addition, counterfeiting can potentially harm consumers as the consumers may not know whether they are receiving an authentic product or safe medications.

Current methods for authenticating products include using hologram labels. However, such labels are expensive to manufacture, unless ordered in large quantities. Other methods may include Internet and server-based authentication systems (e.g., "certificate-based authentication"). However, many parts of the world may not have access to the Internet to perform authentication on the Internet and server based authentication systems.

SUMMARY

According to aspects illustrated herein, there are provided an authentication tag and a method for producing the same. One disclosed feature of the embodiments is an authentication tag comprising a substrate, a correlation mark printed on a first part of the substrate, a key printed on the second part of the substrate, wherein a portion of the substrate is transparent, and at least one raised feature printed on the substrate.

Another disclosed feature of the embodiments is a method for producing an authentication tag. The method may be performed by a processor. In one embodiment, the method receives correlation marks and a key image to be printed, wherein the correlation marks and the key image display an image when the key image is overlaid on the correlation marks, controls a printer to print the correlation marks on a first part of a substrate and the key image on a second part of the substrate, wherein a portion of the substrate is transparent, and controls the printer to print at least one raised feature on the substrate.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an authentication tag and a method for producing the same. As discussed above, labels for medications and other products are counterfeited. Counterfeiting can cost different industries, such as drug makers or the pharmaceutical industry, sports merchandise marketers, or the cosmetics industry, loss of revenue. In addition, counterfeiting can potentially harm consumers as the consumers may not know whether they are receiving an authentic product or safe medications. However, currently used methods may be expensive or impractical for certain parts of the world.

Embodiments of the present disclosure provide an authentication tag and methods for producing the same that are relatively inexpensive to produce, difficult to counterfeit, and self-contained such that access to technology or the Internet is not needed. The present disclosure provides an authentication tag that is cost-effective for small-batch production, or even personalized authentication labels.

In one embodiment, the present disclosure may use UV-printed substrates that have two halves. One part may have correlation marks and the other part may include a key. As a result, if a user knows the image for an authentic medication or product, the user may validate the authenticity of a sample by folding the substrate such that the key reveals the image in the correlation marks.

In one embodiment, the UV printed substrate may also include three dimensional (3D) printed portions. The 3D printed portions may provide raised and/or depressed features that can be used to align the two halves such that they key is properly aligned with the correlation marks. As a result, the present disclosure provides an authentication tag that is relatively inexpensive to produce, but that is difficult to counterfeit.

Figure 1:
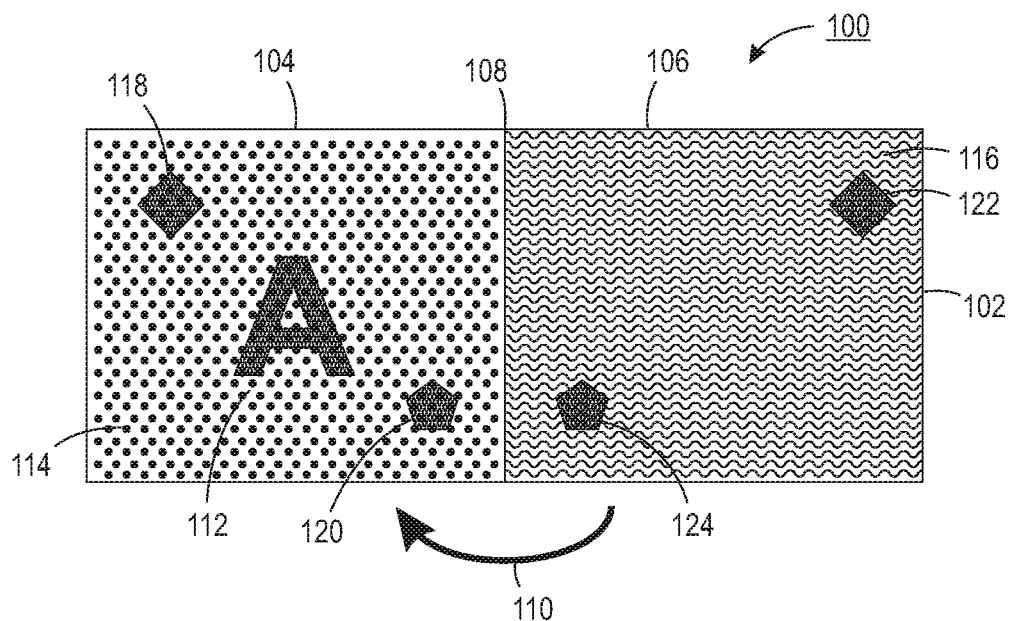
FIG. 1 illustrates a block diagram of a top view of an example authentication tag of the present disclosure.

FIG. 1 illustrates an example authentication tag 100 of the present disclosure. In one embodiment, the authentication tag 100 may include a substrate 102. The substrate 102 may be any type of print medium such as paper, a flexible plastic, a clear plastic, a clear paper, and the like.

In one embodiment, the substrate 102 may have a correlation mark 114 that is printed on a first part 104. The correlation mark 114 may be printed with an image 112 encoded in the printed correlation mark 114. In other words, the image 112 may be an encoded image that is contained within the correlation mark 114 and not visible to the naked eye without a key 116. The image 112 may be a security image that is predefined to authenticate a product that the authentication tag 100 is affixed to. For example, the image 112 may be a logo, text, or combination thereof, that is associated with a company that has produced the product (e.g., a bottle of medicine, a ticket, and, the like).

In one embodiment, the substrate 102 may have the key 116 (or key image) that is printed on a second part 106. In one embodiment, the second part 106 of the substrate 102 that contains the key 116 may be clear. However, it should be noted that the clear portion of the substrate 102 may also be the first part 104 that has the correlation mark 114, or both the first part 104 that has the correlation mark 114 and the second part 106 that has the key 116. In other words, the substrate 102 may be a partially-clear material or a completely-clear material.

In one embodiment, the substrate 102 may be comprised of a combination of different materials. For example, the first part 104 of the substrate 102 may be a card and the second part 106 may be a translucent Mylar window. As a result, when the second part 106 is folded (as shown by an arrow 110) along a line 108 on top of the first part 104, the image 112 may be revealed through the key 116 and the second part 106 of the substrate 102.

In one embodiment, the line 108 may represent a location where the substrate 102 may be folded to overlay and align the key 116 onto the correlation marks 114. Although the line 108 is illustrated as being a vertical line in the center of the substrate 102, it should be noted that the line 108 may be located anywhere on the substrate 102. For example, the line 108 may run diagonally in a corner of the substrate 102, be located horizontally across the substrate 102, off-center in the substrate 102, and the like. In one embodiment, the line 108 may include a plurality of lines 108 if multiple folds are used to overlay and align the key 116 onto the correlation marks 114.

In one embodiment, the correlation mark 114 may be a pattern of images or markings that appear random, but are encoded to contain the image 112, or a portion of the image 112. In other words, the image 112 is shown in FIG. 1 as being visible in the correlation mark 114 for ease of explanation and to illustrate an example of the image 112. However, the image 112 may not be visible in the correlation mark 114 without applying, overlaying, or aligning, the key 116 (that may also be encoded to contain a portion of the image 112) on the second part 106 of the substrate 102. As noted above, the image 112 may be encoded into the correlation mark 114 that is printed onto the first part 104 of the substrate 102 and/or the key 116 that is printed onto the second part 106 of the substrate 102. The correlation mark 114 may be printed in color, in different colors, in black and white, in halftones, or any combination thereof. The correlation mark 114 may be printed via any type of ink, such as ultraviolet (UV) cured inks, latex-based inks, water-based resin inks, electron-beam-curable inks, and the like. In one embodiment, a UV-cured ink may be used. The UV-cured ink may be printed onto the first part 104 of the substrate 102 and cured.

In one embodiment, the key 116 may be a pattern of images or markings that appear random, but are arranged to reveal the image 112 when aligned with, or overlaid on, the correlation mark 114. The correlation mark 114 may be printed in color, in different colors, in black and white, or any combination thereof. For example, the key 116 may include markings or images that block certain images, colors, or patterns on the correlation mark 114, while allowing other images, colors, or patterns to be seen through the second part 106 of the substrate 102. The images, colors, or patterns that are seen through the second part 106 of the substrate 102 may reveal the image 112.

It should be noted that although the correlation marks 114 and the key 116 are printed to cover the entire first part 104 and the second part 106, respectively, of the substrate 102, the correlation marks 114 and the key 116 may be printed to cover less than all of the substrate 102. For example, the first part 104 may be an upper left hand corner of the substrate 104 and the second part 106 may be an upper right hand corner of the substrate 104.

In addition, although the correlation marks 114 and the key 116 are illustrated in FIG. 1 to be printed on opposite ends on the same side of the substrate 102, the correlation marks 114 and the key 116 may be printed on any portion of the substrate 102. For example, the first part 104 may be an upper left hand corner of the substrate 102 and the second part 106 may be a portion of the substrate 102 diagonally below the upper left hand corner of the substrate 102. In other words, as described in further detail below, the first part 104 that has the correlation marks 114 and the second part 106 that has the key 116 may be located anywhere on the substrate 102 as long as the second part 106 can be folded onto the first part 104, or vice versa.

In one embodiment, the authentication tag 100 may also include at least one raised feature 118 and 120. Although two raised features 118 and 120 are illustrated in FIG. 1, it should be noted that any number of raised features 118 and 120 may be deployed (e.g., one or more). The raised features 118 and 120 may be printed with any type of material or jettable ink that can be printed in layers. Example inks may include UV-cured inks, latex-based inks, water-based resin inks, electron-beam-curable inks, and the like. In one embodiment, a UV-cured ink may be used and dispensed using a three dimensional (3D) printer to print the raised features 118 and 120.

In one embodiment, the raised features 118 and 120 may be printed on any portion of the substrate 102. For example, if the key 116 is printed in a corner of the substrate, the raised features 118 and 120 may be printed below the key 116. In other words, the raised features 118 and 120 may not necessarily be printed on top of the key 116 as shown in FIG. 1, if the key 116 does not cover the entire second part 106 of the substrate 102.

The correlation marks 114 that are encoded with the image 112 may be printed by the 3D printer before the raised features 118 and 120 are printed onto the substrate 102. In another embodiment, the raised features 118 and 120 may be printed using layers of a UV-cured ink. For example, the raised features 118 and 120 may be printed in multiple passes and cured to form each layer of the raised features 118 and 120 in a single printing process.

In one embodiment, authentication tag 100 may also include at least one depressed feature 122 and 124. Although two depressed features 122 and 124 are illustrated in FIG. 1, it should be noted that any number of depressed features 122 and 124 may be deployed (e.g., one or more). The depressed features 122 and 124 may be printed with UV-cured ink using a three dimensional (3D) printer or etched out of the substrate 102.

In one embodiment, "printing" the depressed features 112 may include creating the depressed features 122 by adding layers of the substrate 102 during a printing process. In other words, the area around where the depressed feature 112 would be located may be printed layer by layer to create the depressed feature 112.

Although the raised features 118 and 120 are illustrated as being on the first part 104 of the substrate 102 and the depressed features 122 and 124 are illustrated as being on the second part 106 of the substrate 102, it should be noted that the raised features 118 and 120 may be on the second part 106 and the depressed features 122 and 124 may be on the first part 104. In addition, as noted above, the raised features 118 and 120 and the depressed features 122 and 124 may be printed on a first portion and a second portion of the substrate 102 that is different than the first part 104 that has the correlation marks 114 and the second part 106 that has the key.

In one embodiment, the raised features 118 and 120 and the depressed features 122 and 124 may be printed via a 3D printer as part of the substrate 102. In other words, the substrate 102, the raised features 118 and 120, and the depressed features 122 and 124 may be a single component printed by a 3D printer before the image 112, the correlation marks 114 and the key 116 are printed onto the substrate 102. In another embodiment, the raised features 118 and 120, and the depressed features 122 and 124 may be printed onto the substrate 102 separately.

The raised features 118 and 120 may be any shape. The depressed features 122 and 124 may also be any shape. However, the shape of the raised feature 118 may correspond to a shape of the depressed feature 122. Similarly, a shape of the raised feature 120 may correspond to a shape of the depressed feature 124. "Correspond" may be defined to mean being a substantially similar shape and located on aligning locations of the first part 104 and the second part 106. In other words, the raised feature 118 may be a same shape as the depressed feature 122, but slightly smaller in dimensions such that the raised feature 118 may fit into the depressed feature 122 such that the first part 104 may be folded against the second part 106. In other words, the raised features 118 and 120 may be "physical keys" and the depressed features 122 and 124 may be "keyholes". The "physical keys" may be shaped and sized to fit into the "keyholes".

The aligning locations may be defined as being at locations that allow the raised feature 118 to be nested into the depressed feature 122. For example, if the raised feature 118 is on the upper left hand corner of the first part 104, the depressed feature 122 may be in the same location, but in the upper right hand corner of the second part 106. Thus, when the substrate 102 is folded in half, the raised feature 118 may fit into the depressed feature 122. In another example, the aligning locations may be in a portion of the upper left hand corner and a location diagonally below the upper left hand corner. As a result, if the corner is folded diagonally down, the raised feature 118 may fit into the depressed feature 122. As will be discussed in further detail below, the raised features 118 and 120 and the depressed features 122 and 124 may provide an additional authentication parameter for the authentication tag 100.

In one embodiment, substrate 102 may include a pattern of raised features 118 and 120. For example, a first portion of the substrate 102 may include a first series of raised lines. A second portion of the substrate 102 may have a second series of raised lines that are parallel to the first series of raised lines, but offset. As a result, when the substrate 102 is folded to overlay the key 116 onto the correlation marks 114, the first series of raised lines may fit in between the second series of raised lines to properly align the key 116 over the correlation marks 114. In other words, the substrate 102 may use the raised features 118 and 120 without using the depressed features 122 and 124.

Figure 2:
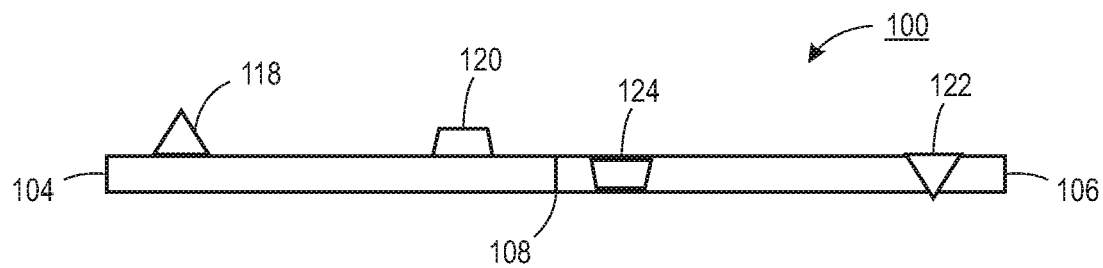
FIG. 2 illustrates a block diagram of a side view of an example authentication tag of the present disclosure.

FIG. 2 illustrates a block diagram of a side view of the authentication tag 100. As shown in FIG. 2, the raised feature 118 may be on a first portion (e.g., the left side of the first part 104 of the substrate 102). The corresponding depressed feature 122 may be on a second portion that is at a location that aligns with the first portion (e.g., a right side of the second part 106 of the substrate when the substrate 102 is folded along the line 108). The raised feature 118 and the depressed feature 122 may mirror one another as the raised feature 118 may be aligned with the depressed feature 122 when the substrate 102 is folded along the line 108 and the first part 104 is brought together with the second part 106.

Figure 3:
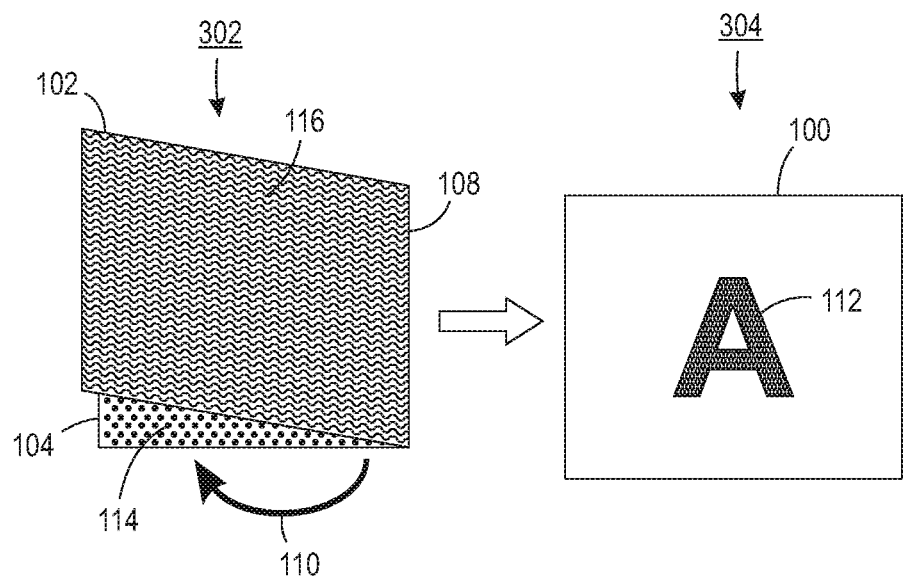
FIG. 3 illustrates a block diagram of a top view of an example authentication tag that is folded to reveal an image.
Figure 4:
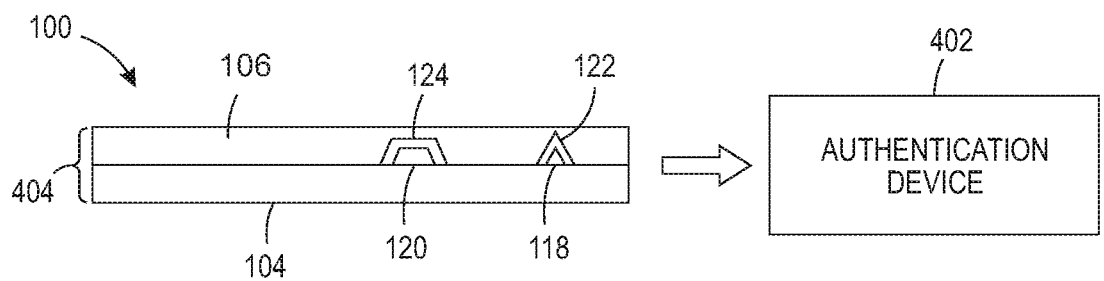
FIG. 4 illustrates a block diagram of a side view of an example authentication tag that is folded to measure a thickness for authentication via an authentication device.

FIGS. 3 and 4 illustrate an example of when the authentication tag 100 is folded. As illustrated in FIG. 3, a top view of the authentication tag 100 being folded as shown by the arrow 110 is shown in image 302. The raised features 118 and 120 may help align the key 116 to the correlation marks 114 by fitting into the depressed features 122 and 124. When the second part 106 that has the key 116 is folded or overlaid on the first part 104 that has the correlation marks 114 and properly aligned, the image 112 may be revealed as shown in the image 304 of FIG. 3.

As noted above, the second part 106 may be folded onto the first part 104 along the line 108 as shown by the arrow 110. The raised features 118 and 120 and the depressed features 122 and 124 may help align the second portion 106 on top of the first part 104 when folded to ensure that the image 112 is properly displayed. FIG. 4 illustrates a side view of the authentication tag 100 that is folded to reveal the image 112.

When the authentication tag 100 is properly folded, the authentication tag 100 may have a particular height 404. The height 404 may be predefined such that a counterfeited authentication tag may not have the same height 404.

In one embodiment, an authentication device 402 may be used to read the authentication tag 100 that is folded. The authentication device 402 may be a ticket reader at an entrance to an auditorium or stadium. The authentication device 402 may include a processor, a memory, a scanner, and a slotted opening to insert the folded authentication tag 100.

In another embodiment, the authentication device 402 may be a mechanical device that ensures that the folded authentication tag 100 has a correct height 404. For example, the mechanical device may have a slot or opening of a particular height. The slot may receive a properly folded authentication tag 100 having the correct height 404. If the height 404 of the authentication tag 100 is not correct, the folded authentication tag 100 may not fit into the slot.

In one embodiment, the authentication device 402 may read the image 112 that is revealed via the scanner and measure the height 404 of the folded authentication tag 100 via the slotted opening. If the image 112 and the height 404 do not match a predefined image and height, the authentication device 402 may reject the forged authentication tag. However, if the image 112 and the height 404 do match a predefined image and height, the authentication device 402 may accept the folded authentication tag 100.

In one embodiment, the authentication tag 100 may be attached to a bottle or a product packaging. A user may fold the authentication tag 100 along the centerline 108 to reveal the image 112. In one embodiment, the substrate 102 may include a tamper-proof backing to prevent the authentication tag 100 from being removed from a product and being re-used on another product.

Referring back to FIG. 1, the line 108 may also be scored to help provide alignment. The scoring may help to ensure that the substrate 102 is properly folded along the line 108. The scoring may be performed as part of the printing process that prints the correlation marks 114 and the key 116. In one embodiment, the scoring may be performed before the correlation marks 114 and the key 116 are printed. In another embodiment, the scoring may be performed after the correlation marks 114 and the key 116 are printed.

As a result, the authentication tag 100 may be used to authenticate products, such as drugs and medicine, authenticate tickets for admission to a show or sporting event, and the like. The authentication tag 100 may be used without any additional devices or access to the Internet. However, in some applications the authentication device 402 may be used.

Figure 5:
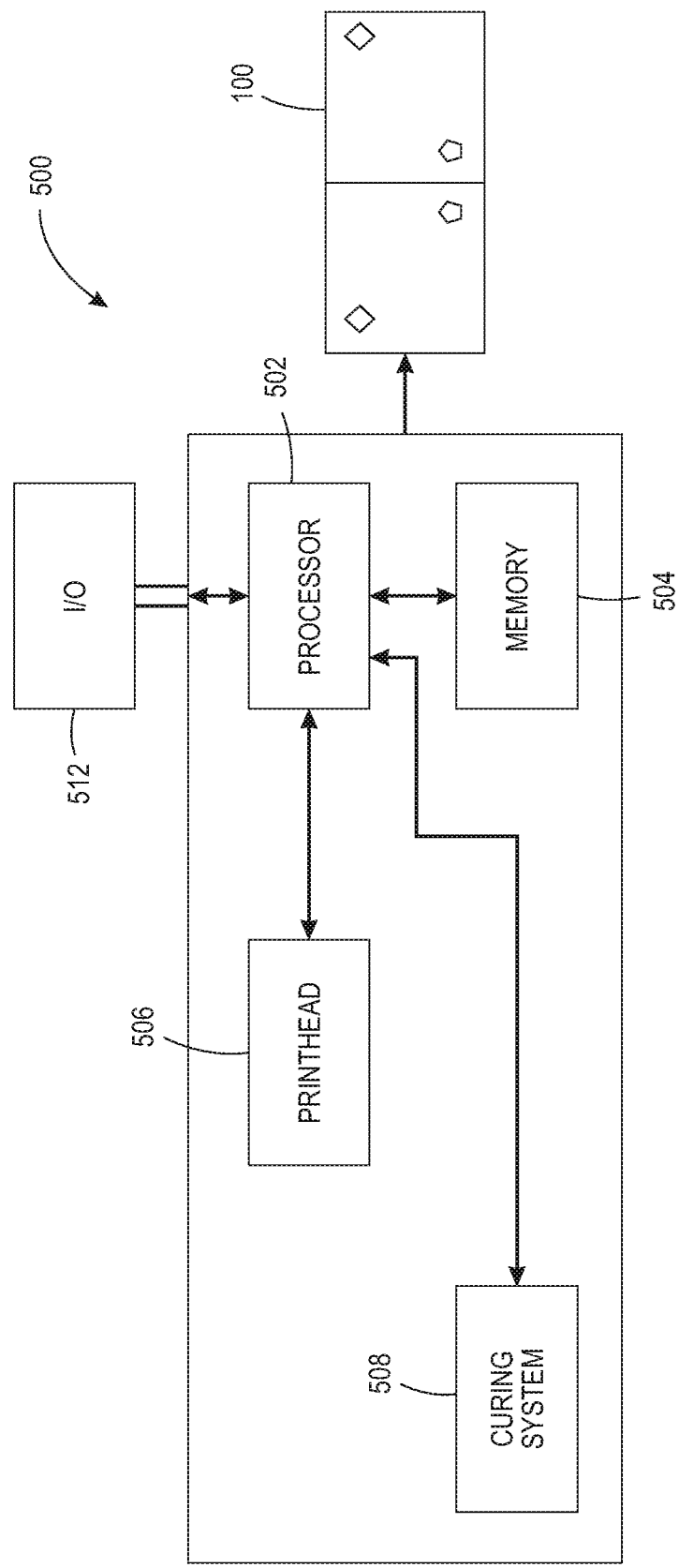
FIG. 5 illustrates a block diagram of a printing apparatus to produce the example authentication tag.

In one embodiment, the authentication tag 100 of the present disclosure may be printed in a single device as part of a single printing process. FIG. 5 illustrates an example printing apparatus 500 that can generate the authentication tag 100. The apparatus 500 may include a processor 502, a memory 504, a printhead 506, a curing system 508, and an input/output (I/O) interface 512. The processor 502 may be communicatively coupled to the memory 504, the printhead 506, the curing system 508, and the I/O interface 512. The processor 502 may control operation of the printhead 506 and the curing system 508.

It should be noted that some of the components of the apparatus 500 may be optional. For example, the curing system 508 may not be used when using certain inks that do not require curing.

In one embodiment, the printhead 506 may be a 3D printhead that dispenses layers of UV-cured ink. Although a single printhead 506 is illustrated in FIG. 5, it should be noted that the printhead 506 may be deployed as a plurality of different printheads 506. For example, one of the printheads 506 may dispense the UV-cured ink and another one of the printheads 506 may dispense a different type of printing material. In another example, one of the printheads 506 may be a UV-cured ink printhead and another one of the printheads 506 may be a separate 3D print head. For example, the UV-cured ink printhead may print the correlation marks 114 and the key 116 and the 3D printhead may print the raised features 118 and 120 and the depressed features 122 and 124.

In one embodiment, the memory 504 may store instructions that are executed by the processor to control printing of the correlation marks 114, the key 116, the raised features 118 and 120, and the depressed features 122 and 124. In one embodiment, the I/O interface 512 may comprise a graphical user interface (GUI) that may be used to enter the desired image, pattern, colors, and any other printing parameters for the image 112, the correlation marks 114, the key 116, the raised features 118 and 120, and the depressed features 122 and 124.

It should be noted that the printing apparatus 500 may include other components that are not shown in FIG. 5. For example, the printing apparatus 500 may include a pathway for the substrate 102 to move through the printing apparatus 500, digital front end, a tray or roller to provide the substrate 102, an output tray, and the like.

As noted above, the authentication tag 100 may be printed on a single printing apparatus 500. In other words, the single printing apparatus 500 may be used to print, build, generate, or create the authentication tag 100. The authentication tag 100 is shown being printed such that the image 112 is hidden, as noted above.

Figure 6:
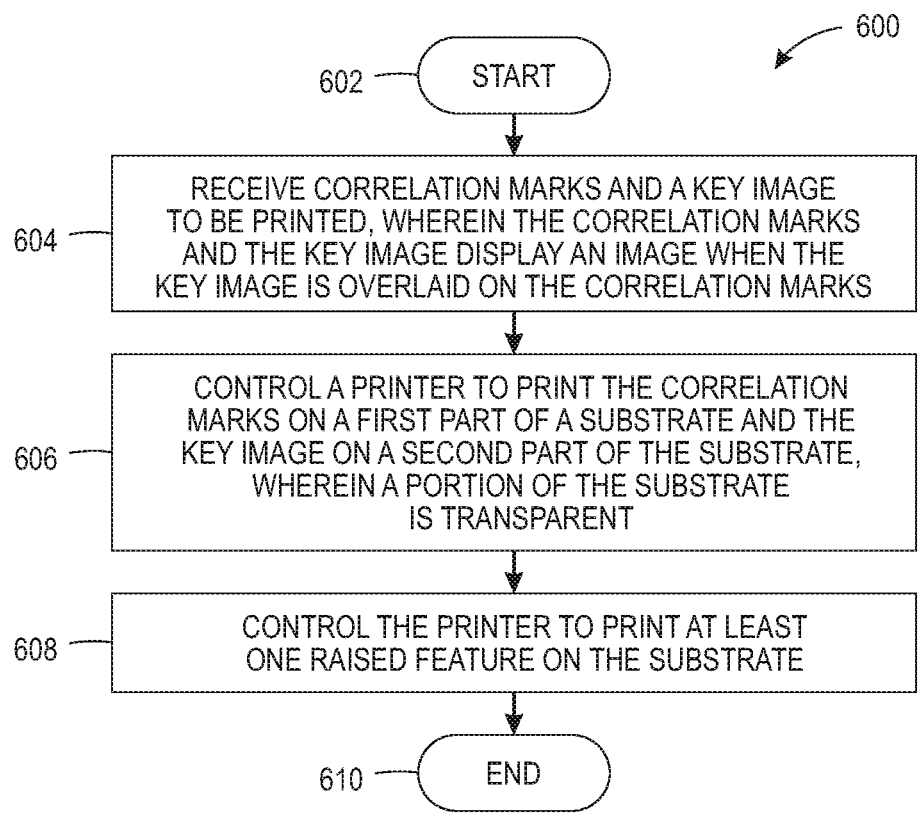
FIG. 6 illustrates a flowchart of an example method for producing an authentication tag.
Figure 7:
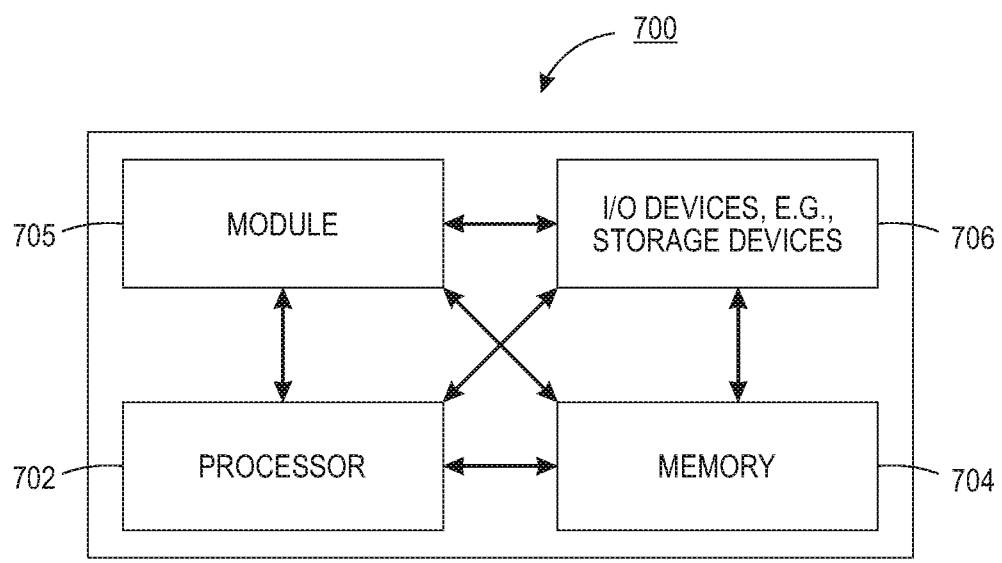
FIG. 7 illustrates a high-level block diagram of an example computer suitable for use in performing the functions described herein.

FIG. 6 illustrates a flowchart of an example method 600 for producing an authentication tag. In one embodiment, one or more steps or operations of the method 600 may be performed by the printing apparatus 500, or a computer/processor that controls operation of a printing apparatus as illustrated in FIG. 7 and discussed below.

At block 602, the method 600 begins. At block 604, the method 600 receives correlation marks and a key image to be printed, wherein the correlation marks and the key image display an image when the key image is overlaid on the correlation marks. The image may be a predefined image that is associated with a particular product, brand, or any image used to authenticate a product. The image may be passed through a correlation mark process to generate a correlation mark pattern to encode or hide the image.

As noted above, the image may be encoded as part of the correlation marks and/or the key. The image may not be visible in the correlation marks without the key. The key may be overlaid on the correlation marks and aligned to reveal the image.

At block 606, the method 600 controls a printer to print the correlation marks on a first part of a substrate and the key image on a second part of the substrate, wherein a portion of the substrate is transparent. For example, the second part of the substrate that has the key image may be transparent, the first part of the substrate that has the correlation marks may be transparent, or both the first part and the second part of the substrate may be transparent. The correlation marks and the key encoded with the image may be printed with a UV-curable ink using a 3D printer.

In one example, the first part and the second part of the substrate may be folded along a line that runs vertically, horizontally, diagonally, and the like, to overlay the key image on top of the correlation marks. The line may be scored to help guide a user to properly fold the second part of the substrate onto the first part of the substrate such that the key is aligned when overlaid on the correlation marks.

When the substrate is properly folded along the line such that the key image on the second part of the substrate is aligned with the correlation marks on the first part of the substrate, the image may appear through the portion, or portions, of the substrate that are transparent. In one embodiment, the second part of the substrate may be a clear substrate to allow the image to be visible through the second part of the substrate, the first part of the substrate may be a clear substrate, or both the first part and the second part may be a clear substrate.

At block 608, the method 600 controls the printer to print at least one raised feature on the substrate. In one embodiment, the at least one raised feature may be printed with UV-cured ink using a 3D printer. For example, the 3D printer may print layers of the UV-cured ink.

In one embodiment, at least one depressed feature may also be printed on a portion of the substrate that aligns with the location of the raised feature or features. For example, if the raised feature is printed on a first part of the substrate, then the depressed feature may be printed on a second part of the substrate that aligns with the first part based on a line on which the substrate is folded, or vice versa. As noted above, the raised feature and the depressed feature may also help to align the key image and the correlation marks when the key image is overlaid on the correlation marks.

In one embodiment, the raised feature and the depressed feature may be any corresponding shape. For example, if the raised feature is a pyramid shape, the depressed feature may also be a pyramid shape, but slightly larger to allow the raised feature to be inserted into the depressed feature.

In one embodiment, the depressed feature may be located in a corresponding location, but opposite part, of the raised feature. In other words, the raised feature and the depressed feature may mirror one another when the opposite halves of the substrate are folded against one another. To illustrate, if the raised feature is located one pixel in and one pixel down from a upper left hand corner of a left part of the substrate, the depressed feature may be located one pixel in and one pixel down from an upper right hand corner of the right part of the substrate.

The raised feature and the depressed feature may be used as an additional authentication mechanism and to help align the first part and the second part when then authentication tag is folded to reveal the image. In one embodiment, the authentication tag may be scored along a centerline to further help guide a user to properly fold the substrate in part.

In one embodiment, two sets of raised features may be used instead of using the depressed feature. As noted above, a first set of raised parallel lines may be printed on a first portion of the substrate and a second set of raised parallel lines that are offset to the first set of raised parallel lines may be printed on a second portion of the substrate that aligns with the first portion. Thus, when the substrate is folded along a line properly, the first set of raised parallel lines may fit between the second set of raised parallel lines.

In one embodiment, the authentication tag may have a tamper proof adhesive and be applied to a product or a packaging (e.g., a medicine bottle). The tamper proof adhesive may prevent the authentication tag from being re-used. For example, the tamper proof adhesive may remove some of the image and/or the correlation marks when attempting to remove the authentication tag from the product or packaging.

In another embodiment, the authentication tag may be distributed as a ticket. The authentication tag can be folded and inserted into an authentication device, as described above, to authenticate the ticket and to ensure that the ticket is not a counterfeit ticket. At block 610, the method 600 ends.

It should be noted that the blocks in FIG. 6 that recite a determining operation or involve a decision do not necessarily require that both branches of the determining operation be practiced. In other words, one of the branches of the determining operation can be deemed as an optional step. In addition, one or more steps, blocks, functions or operations of the above described method 600 may comprise optional steps, or can be combined, separated, and/or performed in a different order from that described above, without departing from the example embodiments of the present disclosure.

FIG. 7 depicts a high-level block diagram of a computer that is dedicated to perform the functions described herein. As depicted in FIG. 7, the computer 700 comprises one or more hardware processor elements 702 (e.g., a central processing unit (CPU), a microprocessor, or a multi-core processor), a memory 704, e.g., random access memory (RAM) and/or read only memory (ROM), a module 705 for producing an authentication tag, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 705 for producing an authentication tag (e.g., a software program comprising computer-executable instructions) can be loaded into memory 704 and executed by hardware processor element 702 to implement the steps, functions or operations as discussed above in connection with the example method 600. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for producing an authentication tag (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An authentication tag, comprising:
a substrate;
a correlation mark printed on a first part of the substrate;
a key printed on the second part of the substrate, wherein a portion of the substrate is transparent; and
at least one raised feature printed on the substrate, wherein the correlation mark, the key, and the at least one raised feature are printed by a single printing device with a single printhead that dispenses ultraviolet (UV) cured ink to print the correlation mark, the key, and the at least one raised feature.

2. The authentication tag of claim 1, wherein the at least one raised feature comprises a first set of raised features on a first portion of the substrate and a second set of raised features on a second portion of the substrate, wherein the second set of raised features is offset from the first set of raised features and a location of the second portion of the substrate is aligned with a location of the first portion of the substrate.

3. The authentication tag of claim 1, wherein the portion of the substrate that is transparent comprises at least one of: the first part with the correlation mark, the second part with the key, or the first part with the correlation mark and the second part with the key.

4. The authentication tag of claim 1, wherein the substrate is scored to align the key with the correlation mark when folded where the substrate is scored.

5. The authentication tag of claim 1, further comprising:
at least one depressed feature printed on the substrate, wherein the at least one depressed feature is on a second portion of the substrate that aligns with the at least one raised feature when the key is overlaid on the correlation mark.

6. The authentication tag of claim 5, wherein the at least one raised feature and the at least one depressed feature are a same shape.

7. The authentication tag of claim 6, wherein the at least one raised feature and the at least one depressed feature are aligned when the substrate is folded such that the at least one raised feature is inserted into the at least one depressed feature to align the key on the second part of the substrate to the correlation mark on the first part of the substrate.

8. The authentication tag of claim 1, wherein the key reveals a pre-defined image in the correlation mark when the key is folded onto the correlation mark.

9. The authentication tag of claim 8, wherein the pre-defined image is associated with a manufacturer to indicate that a product with the authentication tag is authentic.

10. A method for producing an authentication tag, comprising:
- receiving, by a processor of a single printing device with a single printhead that dispenses ultraviolet (UV) cured ink, correlation marks and a key image to be printed, wherein the correlation marks and the key image display an image when the key image is overlaid on the correlation marks;
- storing, by the processor, instructions to print the correlation marks and instructions to print the key image in a memory of the single printing device;
- controlling, by the processor, a printer to print the correlation marks on a first part of a substrate based on the instructions to print the correlation marks stored in the memory of the single printing device and the key image on a second part of the substrate based on the instructions to print the key image stored in the memory of the single printing device, wherein a portion of the substrate is transparent; and
- controlling, by the processor, the printer to print at least one raised feature on the substrate based on instructions to print the at least one raised feature stored in the memory of the single printing device, wherein the correlation mark, the key image, and the at least one raised feature are printed by the single printing device with the single printhead that dispenses the UV cured ink to print the correlation mark, the key image, and the at least one raised feature.

11. The method of claim 10, wherein the portion that of the substrate that is transparent comprises at least one of: the first part with the correlation mark, the second part with the key image, or the first part with the correlation mark and the second part with the key image.

12. The method of claim 10, further comprising:
printing, by the processor, at least one depressed feature on a second portion of the substrate with the UV cured ink based on instructions to print the at least one depressed feature stored in the memory of the single printing device.

13. The method of 12, wherein the portion of the substrate with the at least one raised feature and the second portion of the substrate with the at least one depressed feature are located on the substrate to align when the key image is overlaid on the correlation marks.

14. The method of claim 13, wherein the at least one raised feature and the at least one depressed feature are a same shape.

15. The method of claim 14, further comprising:
- receiving, by a processor of an authentication device, the authentication tag that is folded;
- scanning, by the processor of the authentication device, the image displayed when the key image is overlaid on the correlation marks; and
- measuring, by the processor of the authentication device, a thickness of the authentication tag that is folded.

16. The method of claim 10, further comprising:
scoring, by the processor, the substrate along a center line between the first part and the second part of the substrate.

17. An authentication tag, comprising:
- a correlation mark printed on a first part of a partially-clear substrate;
- a key printed on a second part of the partially-clear substrate, wherein at least the correlation mark or the key is printed on a clear part of the partially-clear substrate, wherein an image is displayed when the key is overlaid on the correlation mark;
- at least one raised feature that is printed on a third part of the partially-clear substrate; and
- at least one depressed feature that is printed on a fourth part of the partially-clear substrate, wherein the at least one depressed feature is a same shape as the at least one raised feature, wherein the third part and the fourth part are located at a position on the partially-clear substrate that align when the partially-clear substrate is folded along a scored portion of the partially-clear substrate to overlay the key on the correlation marks, wherein the correlation mark, the key, the at least one raised feature, and the at least one depressed feature are printed by a single printing device with a single printhead that dispenses ultraviolet (UV) cured ink to print the correlation mark, the key, the at least one raised feature, and the at least one depressed feature.

* * * * *